2,820,485

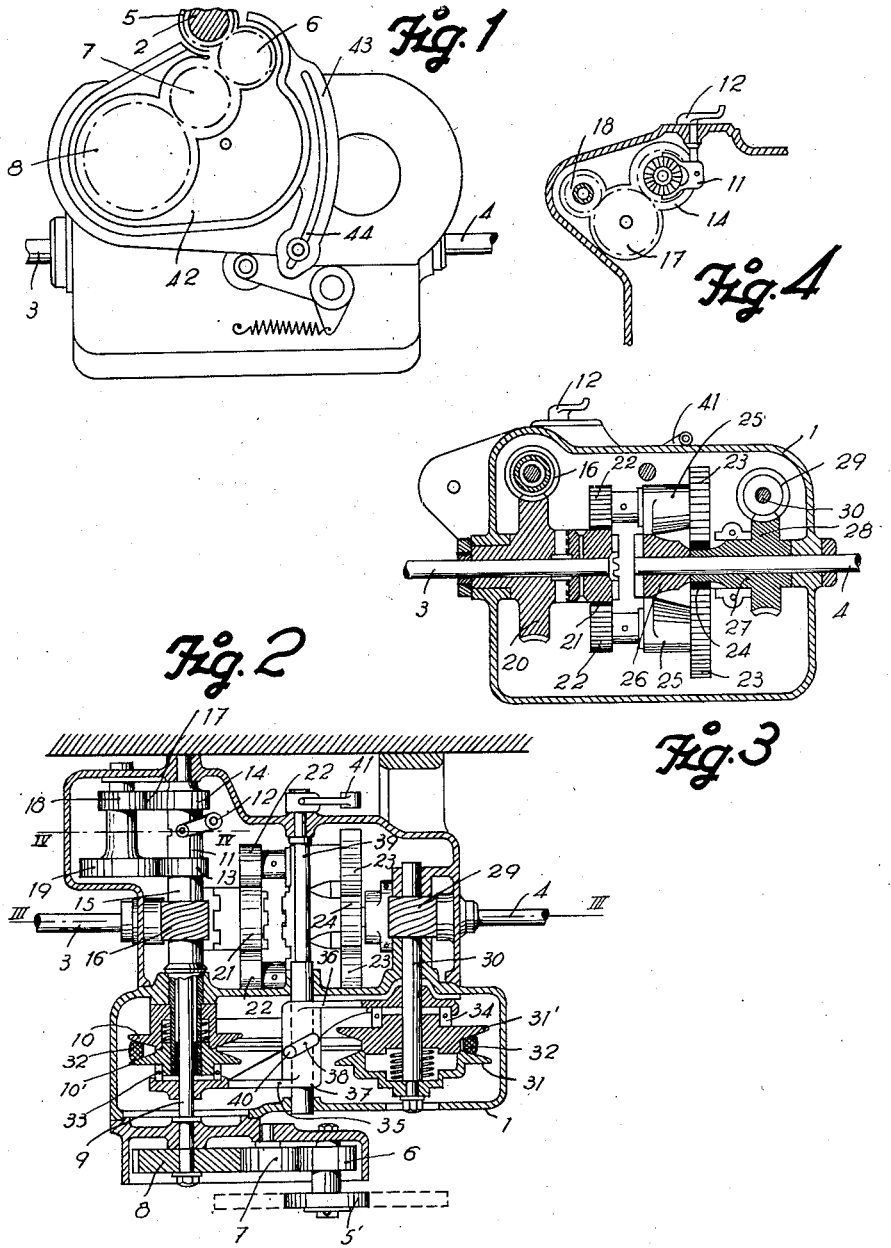

LET-OFF AND TAKE-UP FOR LOOMS

Pedro Cerdans Sellés, Barcelona, Spain

Application October 22, 1952, Serial No. 316,145

2 Claims. (Cl. 139—99)

This invention relates to a let-off and take-up for looms.

It is an object of the invention to provide an automatic mechanism which synchronises the winding movements of the woven cloth with the letting off of the warp, with a slight excess ratio of supply of the warp in order to compensate for the parts of the threads used for tying and for the variations in tension and elasticity of the thread.

With the foregoing and other objects in view, the present invention mainly consists in a let-off and take-up arrangement for a loom in which the winding movements of the woven cloth are synchronized with the letting-off of the warp and comprising, in combination, drive means; a take-up cloth roll driven by the drive means at constant speed for winding up cloth woven on the loom; a differential gear means including a sun gear fixedly connected to the cloth roll, planetary gear means meshing with the sun gear, and a rotatable spider rotatably supporting the planetary gear means; a warp let-off shaft coaxial with the cloth roll and being fixedly connected to the rotatable spider for rotation therewith; a sleeve turnably mounted on the warp let-off shaft; a control sun gear fixedly secured to the sleeve; control planetary gear means meshing with the control sun gear and being mounted on the spider and connected to the first-mentioned planetary gear means for rotation therewith; a variable transmission connecting said drive means with the sleeve for driving the latter and thereby the control sun gear at variable speeds; and control means connected to the variable transmission for varying the ratio of transmission of the same and for adjusting the rotary speed of the control sun gear whereby the speed of the planetary control gear means and the rotary speed of the spider is adjusted for driving the warp let-off shaft at a variable adjustable speed so as to synchronize the letting-off of the warps from the let-off shaft with the winding of the woven cloth onto the cloth roll.

In order that the invention may be more readily understood, reference is made to the accompanying drawings, which illustrate diagrammatically and by way of example one embodiment thereof, and in which:

Fig. 1 is a side elevation of the mechanism;

Fig. 2 is a plan view, partly in section, of the whole mechanism;

Fig. 3 is a section taken on the line III—III of Figure 2; and

Fig. 4 is a fragmentary section taken on the line IV—IV of Figure 2.

The mechanism is arranged inside a casing 1 and is driven by a driving shaft or drive means 2, while on the output side there is a take-up shaft 3 rotating at constant speed and driving the cloth roll. A let-off shaft 4 turning at variable speed and operating the warp let-off device is arranged coaxial with shaft 3.

The drive means 2 drives through a pinion 5 a set of change speed gears 6, 7, 8, which are exchangeable for the purpose of varying the speed of rotation of a shaft 9 which is fixedly connected with gear 8. This shaft 9 drives a pulley section fixedly connected with it, the other section 10' of said pulley being shiftable as will hereinafter be explained. Shaft 9 is connected to a coupling means 11 for rotating coupling means 11 which can be axially shifted by a control 12, to couple either a pinion 13 or a pinion 14 to shaft 9. The pinion 13 is connected through a tubular shaft 15 enclosing the shaft 9 with a worm 16. Pinion 14 can drive the pinion 13 through a gear train 17, 18, 19, so that the rotation of the pinion 13 is reversed depending on whether it is driven directly coupled to the coupling 11 or driven through the reversing gear means 17, 18, 19 from the pinion 14 coupled to shaft 9 by coupling 11.

The worm 16 drives the shaft 3 through a worm gear 20 which is connected by a sleeve to a sun gear 21 which drives planetary gears 22, each of which is connected to a control planetary gear 23 meshing with a control sun gear 24. A spider 25 turnably supporting planetary gears 23 and 24 has a hub 26 fixedly connected to shaft 4, while the sleeve 27 on which the control sun gear 24 is fixed is independent of member 26 and freely rotatable on the shaft 4. A worm gear 28 is fixed on sleeve 27 and is driven by a worm 29 fixed on a control shaft 30, which is driven by a pulley 31, the section 31' of which is axially shiftable similarly to the pulley section 10'. The shiftable section 31' of the pulley 31, and also the shiftable section 10' of pulley 10 are interconnected in such manner that when one of them approaches the respective associated fixed pulley section, the other moves away from the associated section, so that there will be a progressive change of the effective radii of the two pulleys, namely the driving pulley 10 and the transmission pulley 31, which are conected by a belt 32. The movable sections 10' and 31' of these two pulleys 10 and 31 are mounted in bearings 33 and 34 on arms 35 and 36, which are fast with a sleeve 37 provided with helicoidal slot 38. This sleeve is mounted on a shaft 39 and connected to the same by a stud 40 which slides in slot 38 so that, when the shaft 39 turns a certain angle due to operation of a control handle 41, the sleeve 37 will slide axially on the shaft 39 and axial displacements of the movable pulley sections 10' and 31' will take place resulting in a variation of the rotary speed of pulley 31.

In order that the pinion 5 of the input transmission may be exchangeable, it must be possible to vary the distance between shaft 2 and the axis of gear pinion 6, and for this purpose the end support plates 42 which support the shafts of the pinions 6, 7 must turn about the shaft of the pinion 8. The position of the plates 42 is fixed by an arcuate arm 43 provided with a slot 44 in which a locking means is located.

The mechanism of the present invention operates in the following manner: The driving shaft 2 or crankshaft of the loom drives the shaft 9 through the change speed gear means 5, 6, 7, 8 and the shaft 9 drives on the one hand the pulley 10 and on the other hand the coupling means 11. This reversing coupling drives the pinion 13 either directly for normal operation, or indirectly in opposite direction through pinion 14 for the return of the weft thread when it is operated by the weft stop motion, the change being made by the control 12. Through the worm 16 and worm gear 20 the pinion 13 drives the shaft 3 of the cloth roll and also the sun gear 21 and the planetary gears 22 with spider 26, 25, and the latter drives the shaft 4 of the warp let-off mechanism. Since the sun gear 24 and the train of planet wheels 23, and since the crown 24 is driven by the pulley 31 through the shaft 36, worm 29, and worm gear 28 at a variable speed, the planetary control gears 23 turn and the rotation of the shaft 4 will depend on the differential speed produced by the planetary gear means 23 and 22 with their ratios between pinions, and will be influenced by the varying transmission ratio between the variable pulleys 10 and 31, so that in consequence the rotational speed ratio can be varied between the shaft 3 (constant) and the shaft 4 (variable) by operating the control means 37, 38, 39, 40, 41 by which the variable transmission 10, 32, 31 is controlled.

I claim:

1. A let-off and take-up arrangement for a loom in which the winding movements of the woven cloth are synchronized with the letting-off of the warp and comprising, in combination, drive means; a take-up cloth roll driven by said drive means at constant speed for winding up cloth woven on the loom; a differential gear means including a sun gear fixedly connected to said cloth roll, planetary gear means meshing with said sun gear, and a rotatable spider rotatably supporting said planetary gear means; a warp let-off shaft coaxial with said cloth roll and being fixedly connected to said rotatable spider for rotation therewith; a sleeve turnably mounted on said warp let-off shaft; a control sun gear fixedly secured to said sleeve; control planetary gear means meshing with said control sun gear and being mounted on said spider and connected to said first-mentioned planetary gear means for rotation therewith; a variable transmission connecting said drive means with said sleeve for driving the latter and thereby said control sun gear at variable speeds; and control means connected to said variable transmission for varying the ratio of transmission of the same and for adjusting the rotary speed of said control sun gear whereby the speed of said planetary control gear means and the rotary speed of said spider is adjusted for driving said warp let-off shaft at a variable adjustable speed so as to synchronize the letting-off of the warps from said let-off shaft with the winding of the woven cloth onto said cloth roll.

2. A let-off and take-up arrangement for a loom in which the winding movements of the woven cloth are synchronized with the letting-off of the warp and comprising, in combination, drive means; a take-up cloth roll; reversing gear means including a manually operated reversing coupling means, said reversing gear means being connected to said cloth roll for reversing the direction of rotation of the latter in accordance with the position of said coupling means; change speed gear means connecting said drive means with said reversing gear means so that said cloth roll shaft is driven at a selected constant speed from said drive means; a differential gear means including a sun gear fixedly connected to said cloth roll shaft, planetary gear means meshing with said sun gear, and a rotatable spider rotatably supporting said planetary gear means; a warp let-off shaft coaxial with said cloth roll and being fixedly connected to said rotatable spider for rotation therewith; a sleeve turnably mounted on said warp let-off shaft; a control sun gear fixedly secured to said sleeve; control planetary gear means meshing with said control sun gear and being mounted on said spider and connected to said first-mentioned planetary gear means for rotation therewith; a variable transmission connecting said reversing gear means with said sleeve for driving the latter and thereby said control sun gear at variable speeds; and control means connected to said variable transmission for varying the ratio of transmission of the same and for adjusting the rotary speed of said control sun gear whereby the speed of said planetary control gear means and the rotary speed of said spider is adjusted for driving said warp let-off shaft at a variable adjustable speed so as to synchronize the letting-off of the warps from said let-off shaft with the winding of the woven cloth onto said cloth roll.

References Cited in the file of this patent

UNITED STATES PATENTS

| | | |
|---|---|---|
| 562,234 | McIntyre | June 16, 1896 |
| 1,023,994 | Coburn | Apr. 23, 1912 |
| 1,757,026 | Tuttle | May 6, 1930 |
| 1,859,034 | Graef | May 17, 1932 |
| 2,001,180 | Buckner | May 14, 1935 |
| 2,247,153 | Ewart | June 24, 1941 |
| 2,259,823 | Locke | Oct. 21, 1941 |
| 2,334,074 | Coy | Nov. 9, 1943 |
| 2,578,650 | Wright | Dec. 11, 1951 |